United States Patent [19]

Adams et al.

[11] Patent Number: 4,795,906

[45] Date of Patent: Jan. 3, 1989

[54] APPARATUS AND SYSTEM FOR THERMOGRAPHIC IDENTIFICATION OF PARTS

[75] Inventors: Mark J. Adams, Kennesaw, Ga.; Elton M. Crisman, Jr., St. Cloud, Fla.; Asrar A. Khan, Marietta, Ga.

[73] Assignee: Lockheed Corporation, Calabasas, Calif.

[21] Appl. No.: 92,112

[22] Filed: Sep. 2, 1987

Related U.S. Application Data

[63] Continuation of Ser. No. 808,761, Dec. 13, 1985, Pat. No. 4,733,079.

[51] Int. Cl.$^4$ .......................... G01J 1/22; G06K 19/06
[52] U.S. Cl. ........................................ 250/341; 283/88
[58] Field of Search .................. 250/341, 271; 283/88, 283/94

[56] References Cited

U.S. PATENT DOCUMENTS 4,157,784  6/1979  Gröttrup .............................. 283/88
4,469,725  9/1984  Fischer et al. ....................... 283/94

FOREIGN PATENT DOCUMENTS 2013394  1/1987  Japan .................................. 283/88

Primary Examiner—Janice A. Howell
Attorney, Agent, or Firm—Eric R. Katz; Vangelis Economou

[57] ABSTRACT

A method and apparatus for the non-destructive identification of coated and uncoated metal parts employing infrared thermography. The apparatus comprises a means for directing infrared radiation onto the surface of a part; a means for scanning the part surface for reflected infrared radiation; a means for capturing the reflected radiation and converting it into a signal representative of variations in radiation reflected from the surface of the part; means for etching an identifying code into the surface of the part; and means for displaying the signal as a video image. The method comprises altering the surface reflective characteristics of a part to produce an identifying code, irradiating the part with infrared radiation of a specific wavelength and detecting differences in the amount and intensity of radiation reflected from the part.

14 Claims, 2 Drawing Sheets

U.S. Patent   Jan. 3, 1989   Sheet 1 of 2   4,795,906
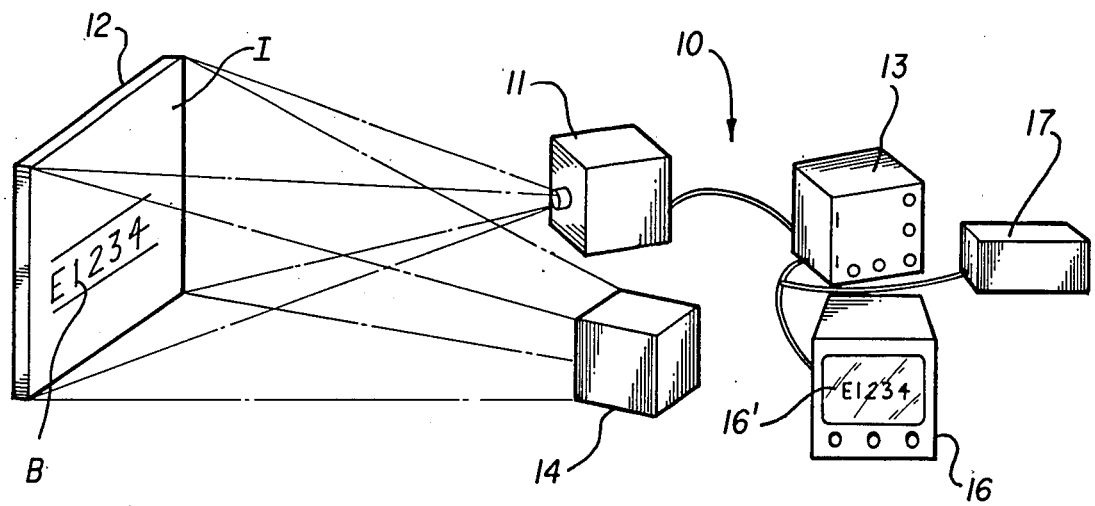
FIG. 1
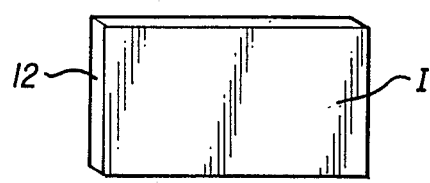
FIG. 2A
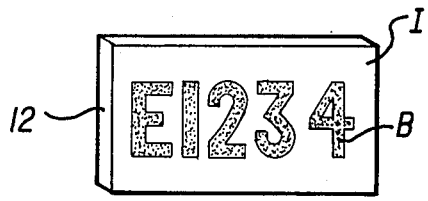
FIG. 2B
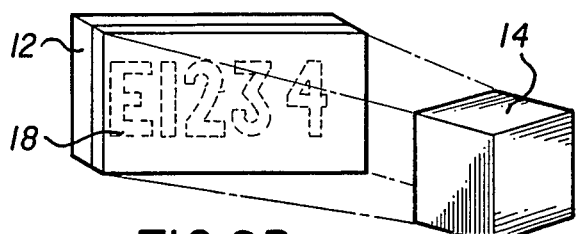
FIG. 2C
FIG. 2D
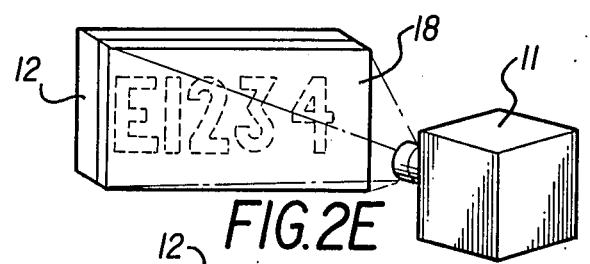
FIG. 2E
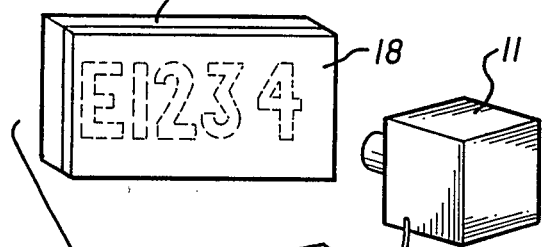
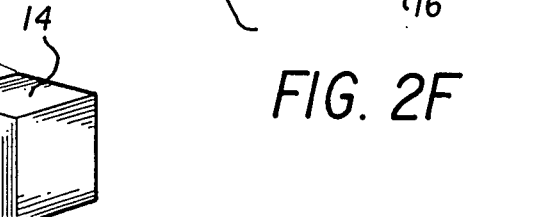
FIG. 2F

APPARATUS AND SYSTEM FOR THERMOGRAPHIC IDENTIFICATION OF PARTS

This is a continuation of co-pending application Ser. No. 808,761 filed on Dec. 13, 1985, now U.S. Pat. No. 4,733,079.

TECHNICAL FIELD

This invention generally relates to a method of and apparatus for using infrared analysis to identify coated metal objects by altering the reflectance of the object in an identifiable pattern prior to the application of the coating and measuring the infrared radiation reflected by the coated object.

BACKGROUND ART

The aerospace industry is subject to stringent requirements for accurately and continuously monitoring and maintaining the identity of individual parts or components which are combined to form the large subassemblies which comprise an aircraft. Present identification techniques employ either an ink or painted number or other identifying mark which is applied directly to the surface of the part or a metal tag which is wired onto the part. These techniques are inadequate because markings applied directly to the part can be either obscured or destroyed by subsequent manufacturing operations and metal tags must be removed for certain operations.

Infrared, non-destructive testing has been used in the past to inspect parts for internal defects. One method of using infrared analysis to inspect parts is disclosed in U.S. Pat. No. 3,504,525. This method involves spraying the part with a vinyl base carrier of a carbon pigment to form a constant, high emissivity surface which is easily removed from the part after testing is complete. After application of the coating, the part is heated with a suitable source of radiant energy and the temperatures of successive spots on the test surface are determined by scanning the coated surface with a radiometer. Output from the radiometer is then transmitted to an oscilloscope or other display device where any flaws in the part are displayed as an infrared image. The method of U.S. Pat. No. 3,504,525 is particularly concerned with controlling the emissivity of the test surface at a standard level by applying a protective coating that has uniform radiating characteristics to the test surface. An essential characteristic of the coating applied to the test surface is that it can be easily removed when the test is completed.

U.S. Pat. No. 3,020,745 also discloses the use of an infrared detector to test metal objects for flaws. In this method the area to be inspected is heated by induced eddy currents which uniformly increase the temperature of the test surface in the absence of flaws. At a flaw, the induced current is concentrated at the edges or corners of the flaw and a hot spot develops which is detected by an infrared detector. This method requires that the test surface be covered with a thick homogeneous coating having a high-emissivity. U.S. Pat. Nos. 4,468,136; 4,429,225; 4,037,473; 3,864,958; 3,808,439; 3,451,254; 3,499,153; 3,433,052, and 3,378,658 also disclose the use of thermographic techniques and apparatus to inspect surfaces for flaws and to measure film thickness. Additionally, "Troubleshooting Products through Infrared Thermography", which appeared in the Nov. 10, 1983 issue of *Machine Design* discusses the use of infrared thermography as an inspection tool. U.S. Pat. Nos. 4,471,822; 4,365,307, 4,343,182; 4,037,473; 3,314,293 and 2,846,882 disclose the use of infrared techqniques and apparatus to measure the temperature of objects.

DISCLOSURE OF THE INVENTION

Accordingly, it is an object of the present invention to provide a non-destructive identification method and apparatus capable of providing rapid and accurate identification of parts during and after the completion of a manufacturing process and which is not affected or interfered with by manufacturing process.

Another object of the present invention is to provide a part identification method and apparatus employing thermographic imaging techniques to detect identifying marks inscribed on the part but which have been obscured by elements of the manufacturing process.

The principal feature of the present invention is the provision of a new approach to the detection of parts as they move through the manufacturing process and are combined to form the large subassemblies which comprise an aircraft, such identification now being accomplished by visual techniques employing wired on metal tags or inked markings applied directly to the surfaces of parts. In accordance with the present invention, a method and apparatus are provided for identifying parts as they pass through the manufacturing process. The method is based upon infrared thermographic analysis and comprises the steps of treating a portion of the surface of a part to alter the surface reflectance of the part in an identifiable pattern, irradiating the surface of the part with infrared radiation and detecting variations in the amount and intensity of infrared radiation reflected by the part.

Another feature of the present invention is the use of a video compatible infrared thermal imaging scanner for detecting variations in reflected infrared radiation as described. The scanner may either be a portable unit or mounted in a fixed portion with respect to the parts to be inspected and produces a television compatible video output signal representative of the infrared radiation reflected by the part. The image of the part surface is displayed on either a black and white or color monitor and may be recorded on video tape for future reference.

In addition to the feature of video compatibility, the invention is further characterized by the simplicity and ease with which the part being identified is subjected to infrared radiation. In accordance with the present invention, the surface of a body which has a substantially constant reflectance is treated so that the reflectance of the surface is altered in a predetermined pattern that is identifiable. For example, the surface reflectance of a part is modified by chemical etching, shot peening, sand or grit blasting or glass bead blasting. A surface so treated will reflect infrared radiation in amounts and of intensity that is different from the untreated areas of the part surface thereby providing an identifiable mark that is visible to the infrared scanner even through several layers of paint or other similar coating.

A very important feature of the present invention is the ability of the infrared scanner to detect differences in reflected radiation even if the part has been painted or otherwise coated in a manner that obscures the identifying mark etched into its surface.

Another feature of the present invention is the provision of a scanner capable of viewing the irradiated surface simultaneously with the application of thermal energy to the test piece.

Another important feature of the present invention is the provision of a method for real time observations of the reflected infrared radiation from the image surface.

Another important feature of the present invention is the provision of a method to read identifying numbers on parts which have been covered with several layers of paint.

One advantage of the present invention is that this method can be used with any metal in either a coated or uncoated condition. While the inventors' primary use of this method will be in the aircraft industry, the invention has broader applicability.

Another important advantage of the present invention is its substantially increased efficiency and accuracy when compared to previous part identification methods and apparatus.

In accordance with these and other objects, features and advantages of the present invention, there is provided a thermographic method for identifying objects which have been coated or painted; the method comprising the steps of providing an object which has a substantially constant reflectance; treating the surface of the object to alter the reflectance of a portion of the object's surface in a unique pattern; directing infrared radiation from a source having a given wavelength onto the surface of the object; scanning the object's surface with a sensing device to detect infrared radiation reflected by the object and to generate a signal representative of reflected infrared radiation; and creating a video image from the signal so that the unique pattern etched into the object surface may be visually observed.

In accordance with the present invention, the method further comprises the steps of providing a template into which the unique pattern is cut; applying the template to the surface of the object so that a portion of the object's surface is visible through the cut portion of the template; and etching the surface of the object through the template so that the unique pattern is permanently inscribed into the surface of the object.

In accordance with the present invention, the method also comprises the steps of electrically grounding the object; providing a positively charged pad that has been immersed in acid; placing the pad over the template; and passing an electrical current through the pad to the object so that the unique pattern is etched into the surface of the object.

In accordance with the present invention the method further comprises the step of directing a stream of abrasive material against the surface of the object which is covered by the template so that the unique pattern is etched into the surface of the object.

The method of the present invention further comprises the steps of scanning the surface of an object with a scanning device to detect infrared radiation reflected by the object; sensing the differences in the amount of radiation reflected from various points on the surface of the object and generating a signal representative of the intensity and location of such differences; transmitting the signal to a video display means; and converting the signal into a video image representative of the pattern of variation and displaying the image on a video display apparatus.

The method of the present invention further comprising the step of directing infrared radiation having a wavelength of from about three to about twenty micrometers onto the surface of the body.

The method of the present invention further including the step of obscuring the unique pattern by applying an opaque coating to the surface of the object.

The method of the present invention wherein the temperature of the infrared radiation source is from about 200° F. to about 700° F.

The present invention also include an apparatus for thermographically identifying objects having a substantially constant reflectance which comprises means for changing the reflectance of a portion of the surface of an object in a unique pattern; means for directing infrared radiation of a given wavelength onto the object; sensing means for scanning the surface of the object to detect infrared radiation reflected by the object and for generating a signal representative of the reflected radiation; and imaging means for creating a video image from such signal.

In accordance with the present invention the means for scanning the surface of the object and generating a signal representative of reflected infrared radiation comprises a scanning camera capable of detecting and capturing infrared radiation which also includes electro-optical transducer means for converting infrared radiation into an electrical signal.

In accordance with the present invention the electro-optical transducer means also includes an infrared signal processor for converting the electrical signal generated by the electro-optical transducer into a video compatible signal representative of the pattern of infrared radiation reflected from the object's surface.

Also in accordance with the present invention, the imaging means comprises a video monitor for converting the video compatible signal into an image representative of the pattern of infrared radiation reflected from the surface of the object.

These and other objects, features and advantages of the present invention will become more readily apparent as the description proceeds with the following more particular description of the preferred embodiment and best mode of carrying out the invention, the apparatus portions of which are illustrated in the accompanying drawings. The accompanying drawings in which like reference characters indicate corresponding parts in all views, are not necessarily to scale, emphasis instead being placed on illustrating the invention.

BRIEF DESCRIPTION OF THE DRAWINGS

FIG. 1 is a schematic representaiton of the apparatus of the present invention.

FIGS. 2A-2F illustrate the thermographic method for identifying bodies in accordance with the present invention;

BEST MODE OF CARRYING OUT THE INVENTION

Figure 3A:
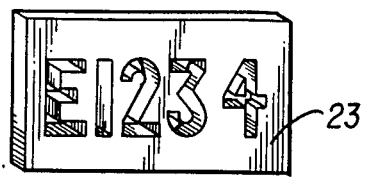
FIGS. 3A-3D illustrate one method for treating the surface of an object to alter the reflectance of such surface by means of applying an abrasive material.
Figure 3B:
Figure 3C:
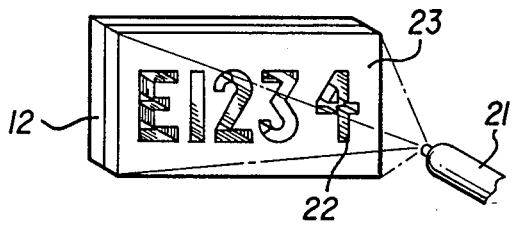
Figure 3D:
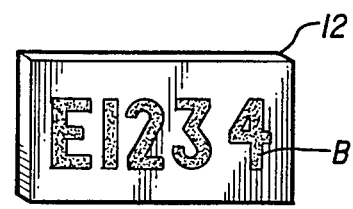
Figure 4A:
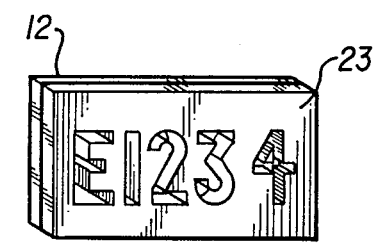
FIGS. 4A-4C illustrate another method for treating the surface of an object to alter the reflectance of such surface using a chemical etching procedure.
Figure 4B:
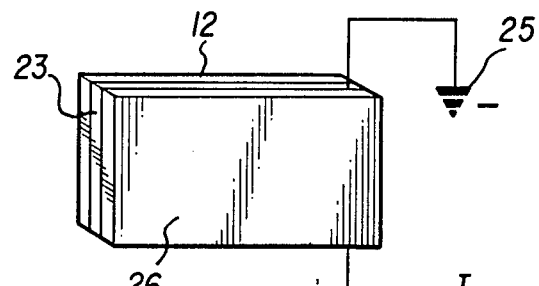
Figure 4C:
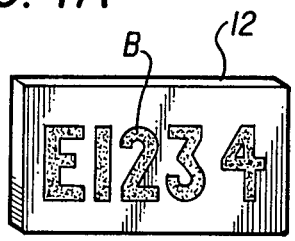
Figure 5:
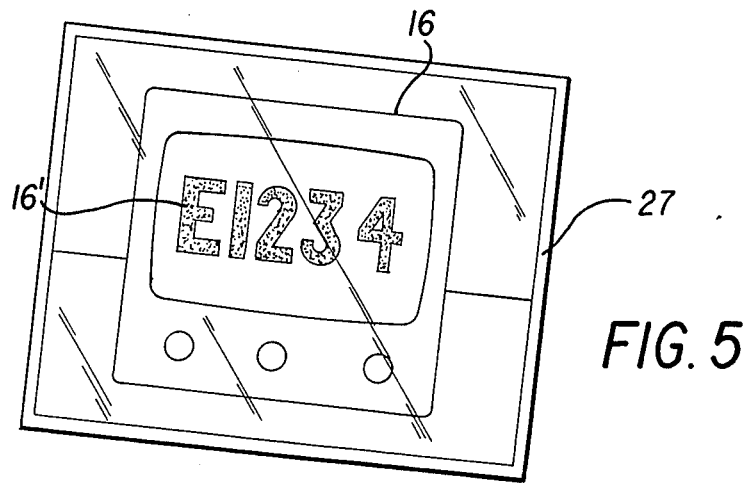
FIG. 5 is a graphic representation of a photograph of a body as viewed by the present invention.

Referring to FIG. 1, the apparatus of the present invention, generally indicated by numeral 10 is illustrated in schematic form in relation to a test of object or body 12. In its simplest form, the apparatus 10 comprises a high resolution infrared scanner 11 which captures infrared radiation reflected from the image side I of an irradiated object 12. Infrared radiation is reflected from object 12 because infrared radiation is directed onto it from radiation source 14. All materials characteristically absorb and reflect infrared radiation. So long as the surface characteristics of a part are substantially the same the amount of infrared radiation reflected by an object will always be the same. If however, the surface of a test object is altered chemically or physically to change the reflective characteristics of the material from which object 12 is made in a particular pattern B the radiation reflected by the object 12 will be representative of such surface. When the reflected infrared radiation is captured by scanner 11, it is converted to a video compatible signal that is transmitted to control electronics unit 13 for display on monitor 16. Scanner 11, for example, might be a Model 525 Infrared Thermal Imaging Scanner produced by Inframetrics, Inc. of Bedford, Mass., uses two low inertia mirrors to scan the image side I of object 12 at television rates. An infrared detector, for example, a liquid nitrogen cooled mercury cadmium telluride (HgCd+Te) detector, converts naturally emitted infrared radiation to an electrical signal which is used to construct a television picture of the pattern of infrared radiation reflected from image side I of object 12 by means of the control-electronic unit 13. FIG. 5 is a graphic representation of a photographic reproduction of such an image.

Control-electronics unit 13 provides the basic display functions of the system. The image 16', can be displayed as a normal television picture with brightness and contrast defining the pattern of surface reflectance's modification performed on the test object 12. The image 16' produced on the monitor 16 can be either in color or in black and white at the preference of the operator. A video tape recorder 17 may be used to record, for permanent retention, the image 16' created from the reflected infrared radiation captured by scanner 11.

Apparatus 10 further comprises infrared source 14 for directing infrared radiation onto object 12, for example, a detail part for use in the fabrication of an aircraft, to be identified. The source of infrared radiation 14, in this embodiment is a bar heater capable of producing infrared radiation of which the majority is in a wavelength of from about three to about twenty micrometers. Such a heater is generally capable of producing temperatures of from about 200° F. to about 700° F. The temperature used is generally chosen to produce best penetration of any surface coating 18, e.g. paint, which might have been applied for example, by a paint applying means 19, such as by direct application or by means of spraying, as shown to image side I of object 12 so that marking pattern B is obscured from observation by normal optical techniques. It has been found that infrared radiation detectors seeing radiation having a wavelength of from 3 to about 5 micrometers or from about 8 to about 12 micrometers are acceptable, however, a detector detecting radiation in the 3 to 5 micron wavelength range produces better image quality because greater coating depths can be penetrated using a detector of a 3 to 5 micron wavelength sensitivity.

It should be understood that the method of the present invention is applicable to subassemblies as well as fully assembled aircraft or other such structures. It should also be understood that the method of the present invention is in fact applicable to any painted or unpainted metal surface, for example, petroleum storage tanks, hulls and bulkheads of ships or oilwell drilling rigs, however, it is most advantageously used in respect to painted surfaces where part identifier markings have been obscured from observation by normal optical techniques.

FIG. 5 is a graphic representation of an ordinary black and white photograph of a test specimen having an identifying number etched into its surface. To produce the image shown in FIG. 5 the image side of the specimen was subjected to steady state infrared radiation in the 3 to 20 micron range and imaged by scanner 11 (FIG. 1) which captured reflected infrared radiation from the surface of the specimen. Because the surface reflectance characteristics of the specimen had been changed by etching an identifying code into it the amount and intensity of the reflected radiation varies across the image surface of the specimen. Local areas of more or less intense reflected radiation then appear as the identifying code B, FIG. 1, when the reflected radiation is captured by scanner 11 and converted into an electrical signal which is in turn converted into a video image 16' and displayed on monitor 16 (FIG. 1).

The identifying code B can be etched into the surface of a part by any standard etching techniques such as grit blasting, with a grit blaster 21 which blasts the surface of the object 12 with grit 22 shot peening or a chemical etching procedure. One efficient technique involves the steps of placing a template 23, having the desired identifying code B cut into it, onto the surface to be etched. After the template has been applied to the part, the part is electrically grounded at 25 and an acid soaked, negatively charged pad 26, is then placed over the template after which an electrical current is passed through the pad to the surface of the part until the identifying code is etched into the surface. The etching process so alters the surface of the part that infrared radiation is reflected in different amounts and intensities from the etched identifying code from that reflected from the untreated portions of the part surface thereby producing variations in reflected radiation which scanner 11 can detect and capture.

Although the invention has been discussed and described with primary emphasis on one preferred embodiment, it should be obvious that adaptations and modifications can be made without departing form the spirit and scope of the invention.

We claim:

1. An apparatus for thermographically identifying at least one object to be protectively coated having at least one surface with an infrared reflectance, said apparatus comprising:
   (a) means for providing the surface of the object with a substantially constant infrared reflectance;
   (b) treating means for treating the surface of the object to alter the infrared reflectance of a portion of the surface of the object in an identifiable pattern;
   (c) coating means for applying a coating to the surface of the object so as to cover at least a portion of the surface;
   (d) infrared radiation directing means for directing infrared radiation of a given wavelength onto the surface of the surface of the object.
   (e) infrared sensing means for scanning the surface of the object to detect infrared radiation reflected from the object and for generating a signal representative of such reflected radiation; and
   (f) imaging means for creating a video image from said signal whereby an optically discernible image visible to the unaided eye is generated.

2. The apparatus of claim 1, wherein said infrared sensing means for scanning the surface of said object and generating a signal representative of reflected infrared radiation comprises scanning camera means capable of detecting and capturing infrared radiation, said camera means further including electro-optical transducer means for converting said radiation into an electrical signal.

3. The apparatus of claim 2, wherein said electro-optical transducer means for converting said radiation into an electrical signal further comprises infrared signal processor means for converting said electrical signal into a video compatible signal representative of infrared radiation reflected from the surface of said object.

4. The apparatus of claim 1, wherein said imaging means comprises video monitor means for converting said video compatible signal into an image representation of infrared radiation reflected from the surface of said object.

5. The identification system of claim 11, wherein said imaging means further comprises a video monitor for converting said video compatible signal into an optically visible image representative of said infrared radiation reflected by said object.

6. The identificaiton system of claim 11, wherein said opaque, protective coating is spread over said predetermined, identifiable, infrared reflectance pattern so that said pattern is not optically visible to the unaided eye.

7. The identificaiton system of claim 6, wherein said opaque, protective coating comprises paint.

8. An apparatus according to claim 1, wherein said treating means comprises:
   (a) a template into which the identifiable pattern is cut;
   (b) means for applying said template to the surface of the object so that a portion of the surface is visible through the cut portion of said template; and
   (c) etching means for etching the surface of the object through the template so that the identifiable pattern is permanently etched into the surface of the object.

9. An apparatus according to claim 8, wherein said etching means comprises:
   (a) grounding means for electrically grounding the object;
   (b) a negatively charged pad that has been immersed in an acidic bath;
   (c) means for placing said pad over said template; and
   (d) means for passing an electrical current through said pad to the object so that the identifiable pattern is etched into the surface of the object.

10. An apparatus according to claim 8, wherein said etching means comprises means for directing a stream of abrasive material against the surface of the object covered by said template so that the identifiable pattern is etched into the surface of the object.

11. An identification system or thermographically identifying objects in a manufacturing process having a surface with a infrared reflectance comprising:
   (a) means for providing the surface of the object with a substantially constant reflectance;
   (b) treating means for treating the surface of the object to alter the infrared reflectance of a portion of the surface of the object in an identifiable pattern;
   (c) coating means for applying a coating to the surface of the object so as to cover at least a portion of the surface;
   (d) an infrared radiation source for generating infrared radiation and for directing said infrared radiation onto the surface of the object;
   (e) an infrared sensor for scanning the surface of the object to detect infrared radiation reflected by the surface of the object and for generating a signal representative of the infrared radiation reflected by the surface of the object;
   (f) an electro-optical transducer for converting the infrared radiation reflected by the surface of the object into an electrical signal;
   (g) an infrared signal processor for converting said electrical signal processor for converting said electrical signal into a video compatible signal representative of the infrared radiation reflected by the object; and
   (h) imaging means for generating a video image from said video compatible signal whereby an optically discernible image visible to the unaided eye is be generated.

12. A system according to claim 11, wherein said treating means comprises:
   (a) a template into which the identifiable pattern is cut;
   (b) means for applying said template to the surface of the object so that a portion of the surface is visible through the cut portion of said template; and
   (c) etching means for etching the surface of the object through the template so that the identifiable pattern is permanently etched into the surface of the object.

13. A system according to claim 12, wherein said etching means comprises:
   (a) grounding means for electrically grounding the object;
   (b) a negatively charged pad that has been immersed in an acidic bath;
   (c) means for placing said pad over said template; and
   (d) means for passing an electrical current through said pad to the object so that the identifiable pattern is etched into the surface of the object.

14. A system according to claim 12, wherein said etching means comprises means for directing a stream of abrasive material against the surface of the object covered by said template so that the identifiable pattern is etched into the surface of the object.

* * * * *